US010711765B2

(12) United States Patent
De Rijcke et al.

(10) Patent No.: US 10,711,765 B2
(45) Date of Patent: Jul. 14, 2020

(54) METHOD FOR CONTROLLING A WIND TURBINE

(71) Applicant: Nordex Energy GmbH, Hamburg (DE)

(72) Inventors: Simon De Rijcke, Hamburg (DE); Niels Hamann, Hamburg (DE); Christian Wessels, Hamburg (DE)

(73) Assignee: Nordex Christian, Hamburg (DE)

( * ) Notice: Subject to any disclaimer, the term of this patent is extended or adjusted under 35 U.S.C. 154(b) by 32 days.

(21) Appl. No.: 16/104,554

(22) Filed: Aug. 17, 2018

(65) Prior Publication Data

US 2019/0055925 A1  Feb. 21, 2019

(30) Foreign Application Priority Data

Aug. 18, 2017 (EP) .................... 17186839

(51) Int. Cl.
*F03D 7/02* (2006.01)
*F03D 7/04* (2006.01)
*F03D 9/25* (2016.01)
*G05B 11/42* (2006.01)
*H02P 9/02* (2006.01)
*G05F 1/10* (2006.01)
(Continued)

(52) U.S. Cl.
CPC ......... *F03D 7/0284* (2013.01); *F03D 7/0272* (2013.01); *F03D 7/042* (2013.01); *F03D 9/255* (2017.02); *G05B 11/42* (2013.01); *G05F 1/10* (2013.01); *H02P 9/02* (2013.01); *F05B 2220/70646* (2013.01);
(Continued)

(58) Field of Classification Search
CPC ...... F03D 7/0284; F03D 9/255; F03D 7/0272; F03D 7/042; G05B 11/42; G05F 1/10; H02P 9/02; H02P 2101/15; H02P 9/007; F05B 2220/70646; F05B 2270/309;
(Continued)

(56) References Cited

U.S. PATENT DOCUMENTS 7,714,458 B2 * 5/2010 Harms .................. F03D 7/0224
290/44
7,948,102 B2 * 5/2011 Schubert ................ H02P 9/007
290/44
(Continued)

FOREIGN PATENT DOCUMENTS

DE  102009014012 A1  9/2010
DE  102012224067 A1  6/2014
(Continued)

*Primary Examiner* — Tulsidas C Patel
*Assistant Examiner* — Joseph Ortega
(74) *Attorney, Agent, or Firm* — Barclay Damon LLP

(57) ABSTRACT

A method is provided for controlling a wind turbine that has a generator that is controlled via a converter in a boost operation, in which an electrical power that is fed into an electrical transmission network is increased via a generative deceleration of the generator. The method comprises using a control to determining a set point value for a generator torque depending on an actual value of a rotational speed. The determined set point value for the generator torque is applied to a generator via a limiter with a predefinable upper and lower limit. Determining the set point value for the generator torque in boost operation that leads to an increased fed-in electrical power in response to a boost signal; and limiting a temporal change of the set point value for the generator torque in a recovery operation in response to a recovery signal.

11 Claims, 11 Drawing Sheets

(51) Int. Cl.
    *H02P 9/00*      (2006.01)
    *H02P 101/15*    (2016.01)
(52) U.S. Cl.
    CPC ... *F05B 2270/309* (2013.01); *F05B 2270/327* (2013.01); *F05B 2270/335* (2013.01); *F05B 2270/701* (2013.01); *F05B 2270/705* (2013.01); *H02P 9/007* (2013.01); *H02P 2101/15* (2015.01)
(58) Field of Classification Search
    CPC .......... F05B 2270/327; F05B 2270/335; F05B 2270/701; F05B 2270/705
    See application file for complete search history.

(56)         References Cited

U.S. PATENT DOCUMENTS

| | | | |
|---|---|---|---|
| 8,046,110 B2* | 10/2011 | Mayor | F03D 7/0284 290/44 |
| 9,709,037 B2* | 7/2017 | Sagi | F03D 9/11 |
| 10,393,092 B2* | 8/2019 | Drossel | H02J 3/46 |
| 2011/0135470 A1* | 6/2011 | Merkel | F03D 7/0244 416/1 |
| 2012/0205912 A1* | 8/2012 | Wakasa | F03D 7/0284 290/44 |
| 2012/0313593 A1* | 12/2012 | Knuppel | F03D 7/0284 323/234 |
| 2015/0333501 A1 | 11/2015 | Geisler et al. | |
| 2015/0361964 A1* | 12/2015 | Daher Adegas | F03D 7/043 416/1 |
| 2015/0381089 A1* | 12/2015 | Tarnowski | H02J 3/24 307/84 |
| 2016/0027294 A1* | 1/2016 | Magnus | F03D 80/40 340/514 |
| 2017/0009740 A1* | 1/2017 | Geisler | H02J 3/386 |

FOREIGN PATENT DOCUMENTS

DE    102015208554 A1    11/2016
EP        2532888 A1    12/2012

\* cited by examiner

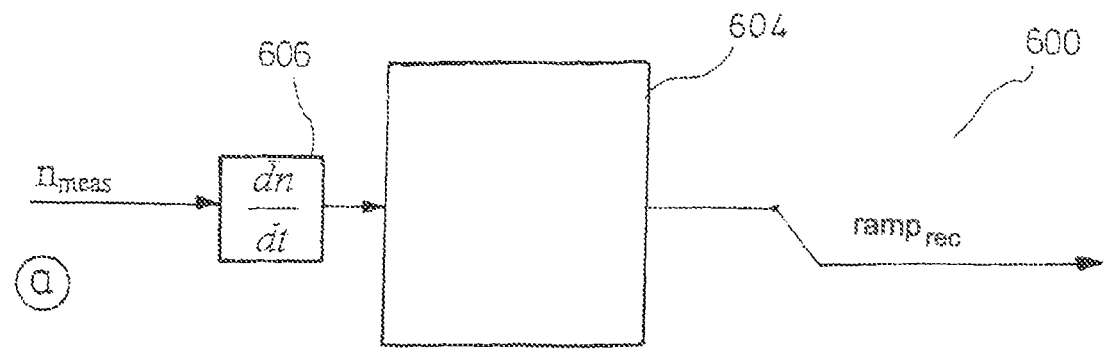
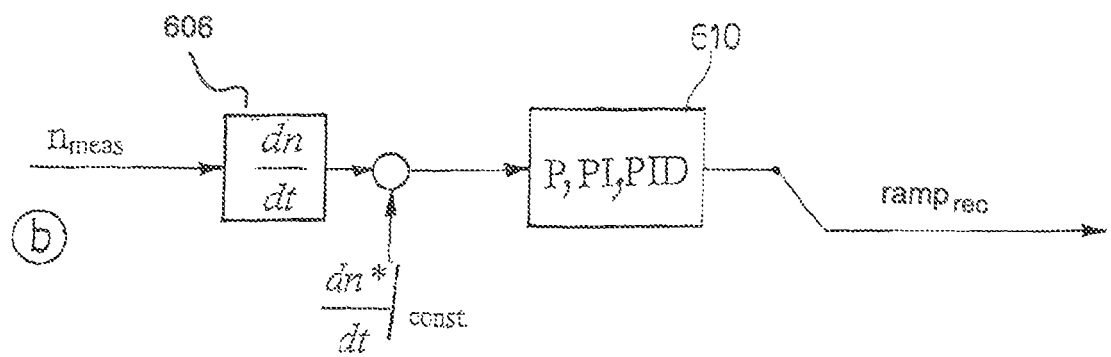
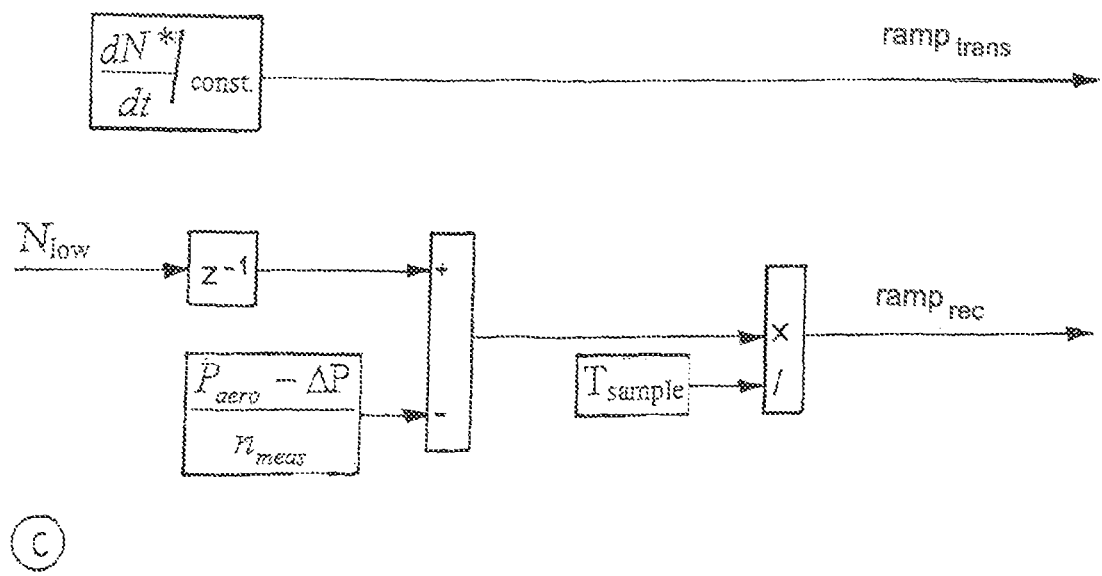
FIG. 7a-c

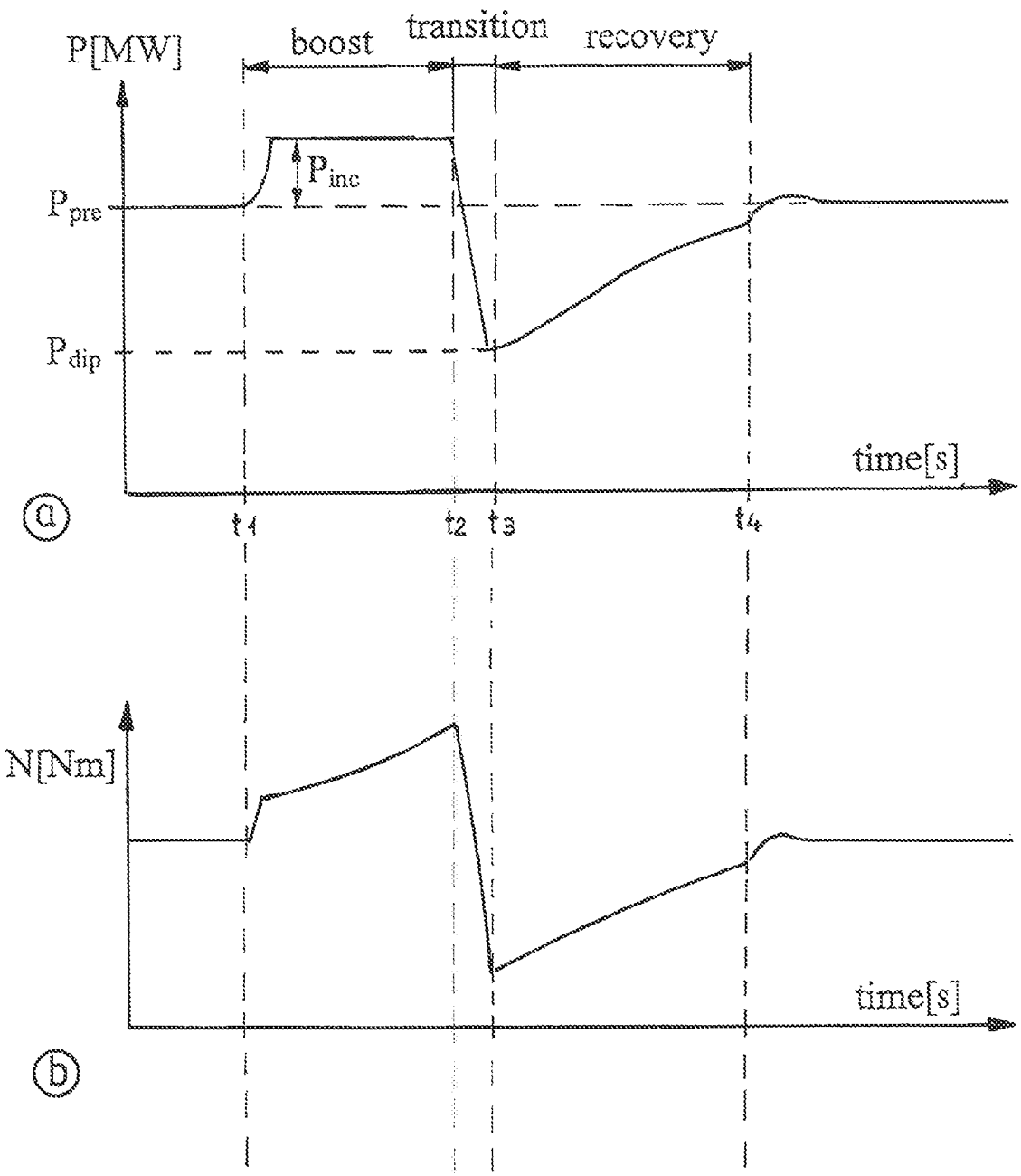
FIG.8 (a,b)

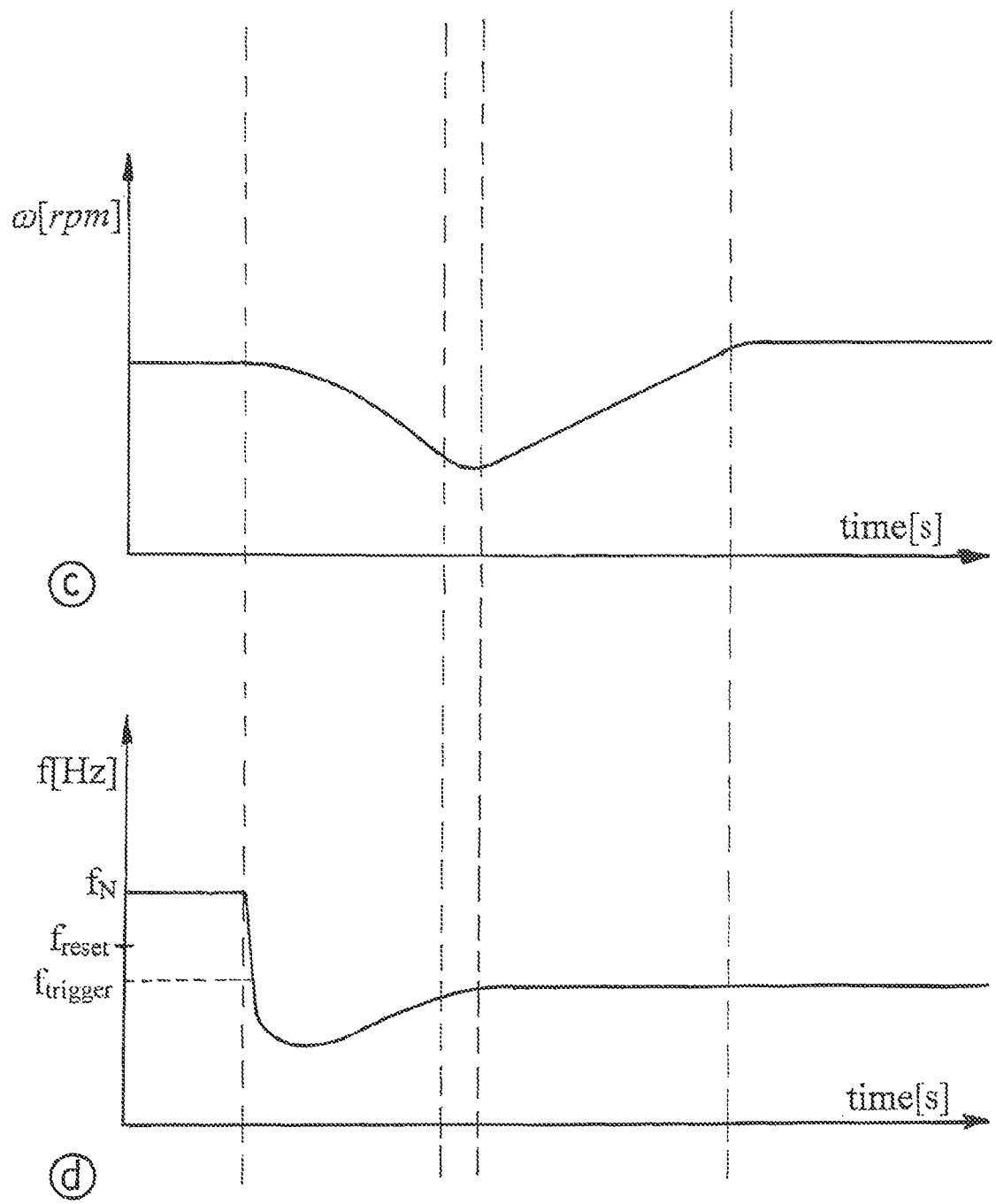
FIG. 8 (c,d)

METHOD FOR CONTROLLING A WIND TURBINE

CROSS REFERENCE TO RELATED INVENTION

This application is based upon and claims priority to, under relevant sections of 35 U.S.C. § 119, European Patent Application No. 17 186 839.1, filed Aug. 18, 2017, the entire contents of which are hereby incorporated by reference.

BACKGROUND

The present invention relates to a method for controlling a wind turbine in which an electrical power fed into an electrical transmission network is increased in a boost operation via a generative deceleration of the generator.

The present invention relates to the control of a wind turbine for a mode of operation referred to as "virtual inertia." For the purpose of grid support, an excessive amount of power, in particular effective power, is hereby fed into the electrical transmission network at short notice. For this purpose, the wind turbine emulates an underfrequency response of conventional synchronous generators. From the perspective of the energy balance, for feeding in the excessive power value, the rotational energy stored in the rotating mass of the wind turbine is converted at short notice and for a short time into electrical power via the generator and fed into the electrical transmission network. This process leads to more electrical power being fed into the transmission network in a boost operation than is converted and can be converted from the wind at short notice in the form of mechanical power. This leads to a decrease of the rotational speed and, linked therewith, of the stored rotational energy. At the end of the boost phase, the wind turbine is at an operating point with regard to rotational speed and torque that is not suitable for continuous operation. In a recovery phase, the wind turbine is then transferred to an operating point at which the rotational speed and torque are at a predetermined ratio that is optimal for taking up power from the wind and at which the wind turbine can be operated continuously. The method and procedure for virtual inertia are difficult to perform from a control engineering perspective.

A control arrangement for virtual inertia operation on a wind turbine is known from EP 2 532 888 A1, in which a two-state control (bang-bang control) is used to control the power generation while providing a power boost.

BRIEF SUMMARY OF THE INVENTION

The object of the present invention is to provide a method for operating a wind turbine that, with simple means, enables reliable control of the operation during and after a provision of increased electrical power.

A method is provided for controlling a wind turbine equipped with a generator that is controlled via a converter. The wind turbine is configured with a boost operation in which electrical power fed into an electrical transmission network is increased via a generative deceleration of the generator. In boost operation, increased power that stems from a generative deceleration of the wind turbine is fed into the electrical transmission network. The generative deceleration causes the rotational energy stored in the rotating parts to be converted into electrical power. The operating method provides that a set point value for a generator torque is determined depending on an actual value of the rotational speed. This is thus a rotational speed-dependent torque control. In the method, the determined set point value for the generator torque is applied to a converter via a limiter with a predefinable upper and lower limit. If a boost signal occurs, a set point value for the generator torque in boost operation is determined. In boost operation, an actual value of the power that is fed in is increased compared to the value before boost operation is triggered. Toward the end of boost operation, a recovery signal is set that initiates a return of the wind turbine to a stable state that is suitable for continuous operation. According to the invention, a temporal change of the set point value for the generator torque is limited for recovery operation in response to the recovery signal. A recovery signal does not necessarily have to be in the form of a flag bit, it can also consist in the checking of triggering conditions for a recovery operation. In the case of such recovery operation, the speed with which the generator torque is changed is limited. By this, a continuous and better controllable return to a stable operating state that is suitable for continuous operation is achieved and excessive fluctuations in the recovery phase are avoided.

In a further embodiment of the method according to the invention, with the recovery signal set, an upper and lower limit for the generator torque are set so that the wind turbine is again in a regular state when one of these limits are reached.

In another embodiment, with the recovery signal set, the maximum permissible temporal change of the set point value for the generator torque is determined depending on the temporal change of the rotational speed. The temporal change of the rotational speed hereby specifies the temporal change of the generator torque.

As another embodiment, the temporal change of the set point value of the generator torque can also be determined depending on an actual value of the power that is fed in when the recovery signal occurs and on the current actual value of the rotational speed.

In another embodiment, it is also possible to determine the temporal change of the set point value of the generator torque depending on the actual value of the rotational speed and the power available in the wind flowing over the mechanical rotor of the wind turbine. It is further possible, with the recovery signal set, to determine the maximum permissible temporal change for the set point value of the generator torque depending on the temporal change of the rotational speed, wherein a control with a P element and/or a PI element can be employed as the control. The control considers the temporal change of the rotational speed, wherein a constant value for the temporal change of the rotational speed is added to it.

In a further embodiment of the method according to the invention, the boost signal is reset when either a predetermined period of time $T_{boost}$ has elapsed since the boost signal occurred or the actual value of the frequency in the electrical transmission network is greater than a second predetermined frequency value, which is greater than the first predetermined frequency value. Resetting the boost signal does not necessarily comprise canceling a signal or deleting a flag bit, but can also be characterized generally as the termination of a first operating phase of boost operation. This leads to a hysteresis which ensures that the frequency rises above the triggering threshold before boost operation is terminated. In particular the temporal limitation is important so that boost operation is not extended for too long, for example until the rotational speed falls too much. In principle, other conditions for resetting the boost signal can also be provided, for example the rotational speed or another operating variable of the wind turbine.

In a further embodiment, a transition signal is first generated when the boost signal is reset. The transition signal initiates so-called transition operation. In transition operation, the maximum permissible change of the set point value for the generator torque can preferably be set to a constant value in response to the transition signal. In doing so, a faster rise of the generator torque for transition operation is aimed for.

A preferred criterion for setting the recovery signal and resetting the transition signal is that the actual value of the rotational speed increases and at the same time the power that is fed in is smaller than the power available in the wind. The last criterion ensures that even more power can be fed in in the context of the recovery.

In an embodiment, a ramp function controls the temporal change of the set point value for the generator torque.

Recovery operation is terminated when the set point value of the generator torque is within a range specified by the upper limit and the lower limit of the limiter. Correspondingly set upper and lower limits from regular operation can ensure a termination of recovery operation.

In an embodiment of the method, the boost signal is generated when the frequency in the electrical transmission network falls below a first predetermined frequency value. The drop of the frequency below the first predetermined frequency value triggers the boost signal. Furthermore, in boost operation, the calculated set point value for the generator torque is applied to the limiter both as the upper limit and as the lower limit. This has the advantage that the conventional rotational speed/torque control can be carried on with and a newly calculated set point value for the generator torque can be set by combining the upper and lower limit at the limiter.

BRIEF DESCRIPTION OF THE DRAWINGS

A preferred exemplary embodiment of the invention is explained in greater detail below based on the figures. In the figures:

FIG. 7a illustrates an embodiment of a method for operating the wind turbine in transition and/or recovery operation;

FIG. 7b illustrates a second embodiment of a method for operating the wind turbine in transition and/or recovery operation;

FIG. 7c illustrates a third embodiment of a method for operating the wind turbine in transition and/or recovery operation;

FIG. 8a illustrates the qualitative course of effective power in the electrical transmission network over time;

FIG. 8b illustrates the qualitative course of generator torque in the electrical transmission network over time;

FIG. 8c illustrates the qualitative course of rotational speed in the electrical transmission network over time; and FIG. 8d illustrates the qualitative course of grid frequency in the electrical transmission network over time.

DETAILED DESCRIPTION OF THE INVENTION

Figure 1A:
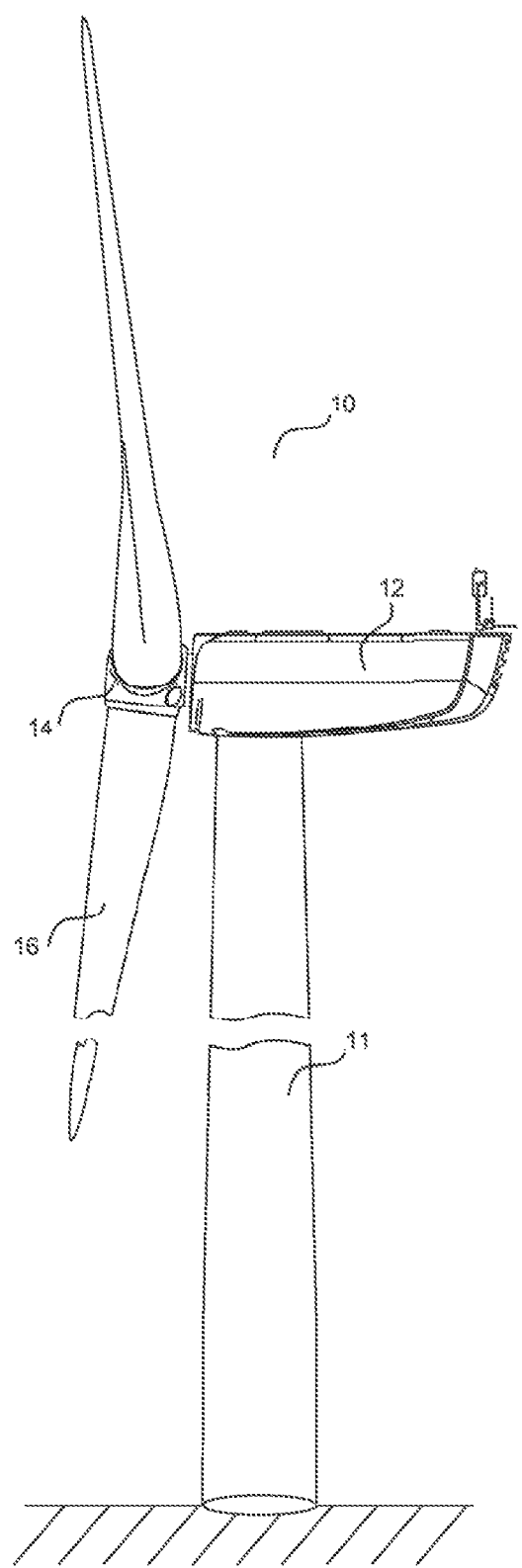
FIG. 1a illustrates a side plan view of an embodiment of a wind turbine.
Figure 1B:
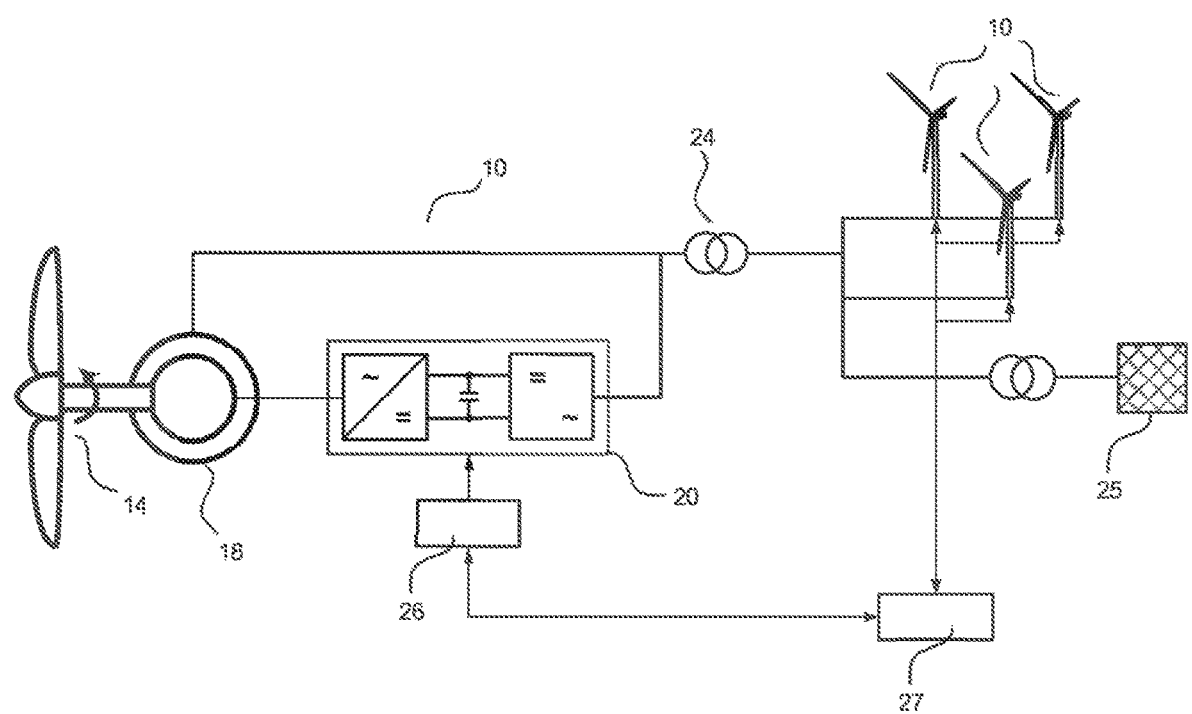
FIG. 1b illustrates a schematic view of an embodiment of a wind turbine feeding into the electrical transmission network.

FIG. 1a shows a schematic view of a wind turbine 10 with a tower 11, a nacelle 12, and a rotor 14. The rotor supports multiple rotor blades 16 that take up power from the wind. FIG. 1b shows an embodiment of a wind turbine 10 with a double-fed asynchronous generator 18 which is connected to an electrical transmission network 25, on the rotor-side via a converter 20 and on the stator-side directly, i.e., without insertion of a converter. Alternatively, the wind turbine can also be configured with a full-scale converter. Feeding into the electrical transmission network 25 takes place, for example, via a transformer 24. The wind turbine 10 can be part of a wind farm consisting of multiple wind turbines 10 that, for example, are connected to the electrical transmission network 25 via a wind farm collector bus and a high-voltage transformer. The wind turbine 10 has a control 26 that is connected for data communication to the converter 20 or respectively to its control. The control 26 is connected for data communication to a wind farm control 27 that is configured for controlling multiple wind turbines 10. The method according to the invention can preferably be implemented in the control 26. In principle, the invention can also be employed on the level of the wind farm in that set point values are set for each individual wind turbine 10 by the wind farm control 27 and a frequency is measured at the feed-in point or in the wind farm collector bus.

Figure 2:
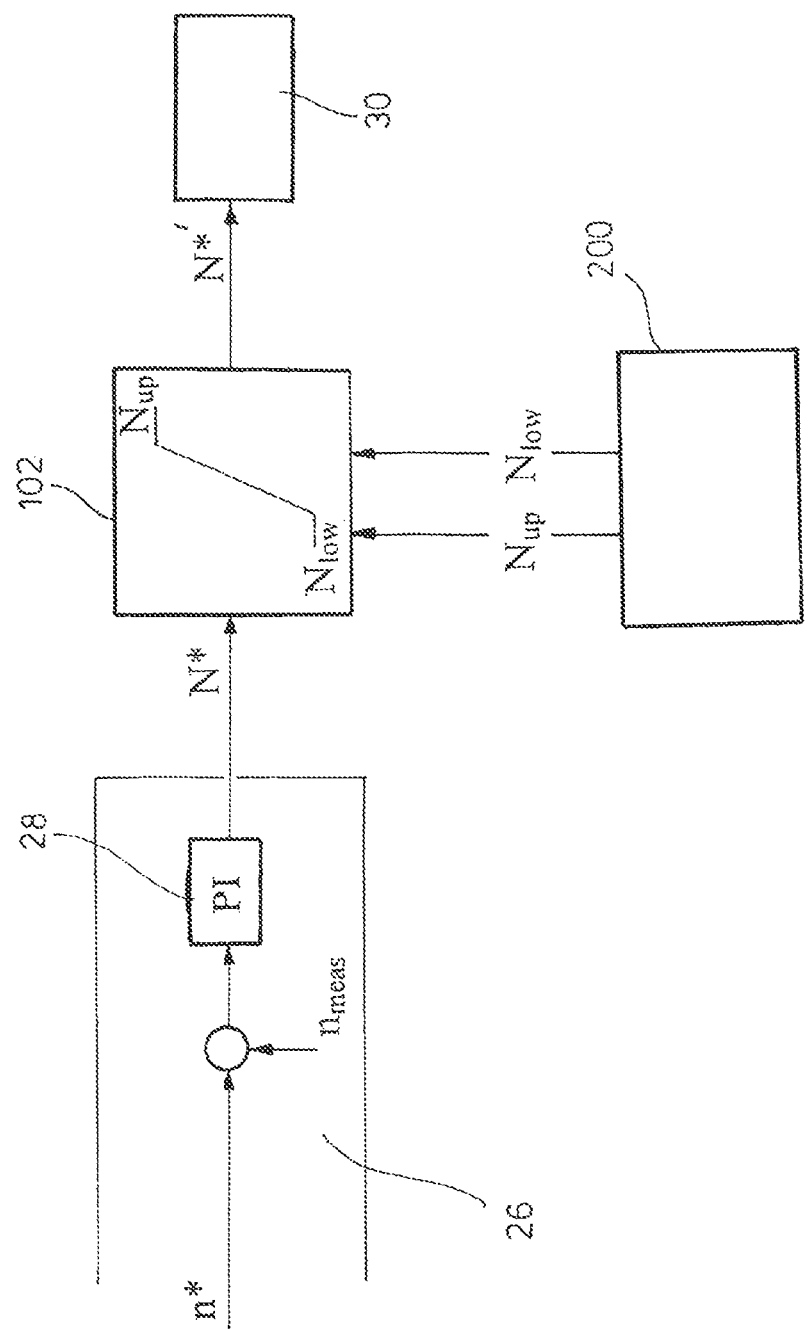
FIG. 2 illustrates a schematic diagram of an embodiment of a torque control of a converter.

FIG. 2 shows a schematic view of a control 26 for the normal operation of the wind turbine. Via a PI control, a control deviation consisting of a rotational speed set point value n* and an actual value of the rotation speed $n_{meas}$ is corrected and converted into a torque set point value N* 101 for the converter. The torque set point value N* is applied to a limiter 102. The limiter is a limiter with an adjustable lower and upper limit (dynamic limiter). The lower limit $N_{low}$ and the upper limit $N_{up}$ are set by a limiter control 200. The limiter control 200 can also be provided with procedures for braking the wind turbine. Procedures for the voltage faults in the transmission network, known as methods for performing fault ride-through (FRT), can also be provided. In the present case, the situation of virtual inertia and its procedure, in which rotational energy is captured from the rotating part of the wind turbine when the fed-in electrical power is increased, is discussed. The output value of the limiter 102 is used to actuate the generator torque N*. The control of the generator torque takes place depending on the generator used and its switching mode. In the case of the double-fed induction machine 18 mentioned above, the generator torque is adjusted, for example, by actuating the converter. The generator torque is the electrical torque that must be applied to the generator in order to generate electrical power. In the example represented in FIG. 2, the set point value for the generator torque N* is applied to a converter 30 that can correspond to the generator-side or the grid-side converter 20, 22, or both.

The virtual inertia operating state uses a measured frequency $f_{meas}$ in the feed-in point of the wind turbine. The measured frequency value $f_{meas}$ represents the actual value and detects a deviation from the rated value. In a wind farm with multiple wind turbines that are connected together, a farm control receives the measured frequency and forwards the measured frequency without further processing to all the connected wind turbines or induces a corresponding procedure at the wind turbine. Alternatively, the frequency can also be measured locally for one or multiple turbines, which avoids a delay in operating time and a communication effort in the wind farm.

The frequency measurement is evaluated in the control of the wind turbine in order to trigger the virtual inertia function. When the frequency falls below a triggering frequency $f_{trigger}$ as the first predetermined frequency value, then the method for virtual inertia is activated in the limiter control 200. If the virtual inertia function is activated, a corresponding boost signal is set and a series of operating states are run through: boost operation and recovery operation with possibly an interposed transition operation.

Figure 4:
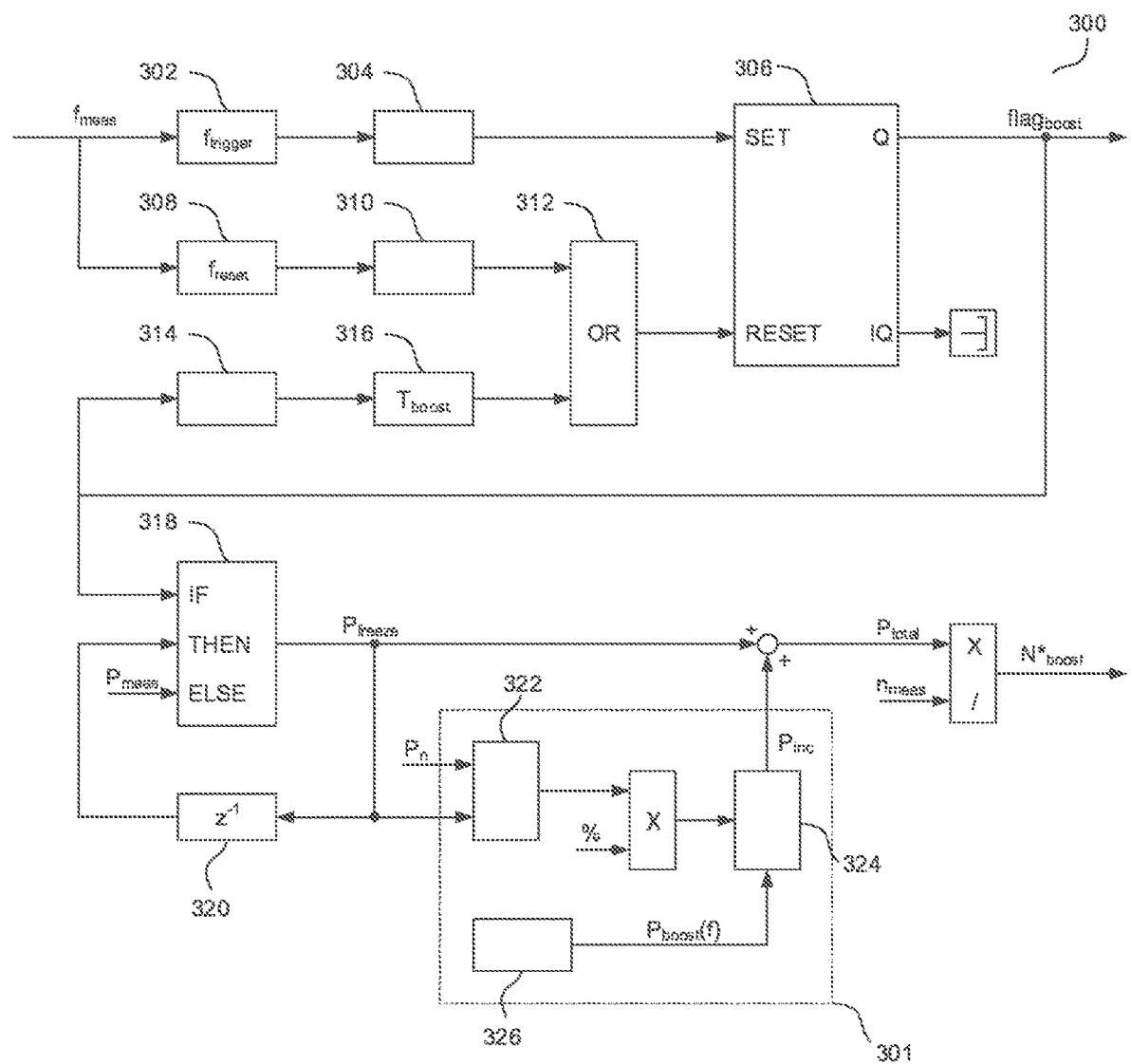
FIG. 4 illustrates a schematic diagram for determining the set point value for the generator torque.

FIG. 4 describes the generation of the boost signal $flag_{boost}$ as well as of the set point value for the generator torque $N_{boost}$. The input variable for the generation of the boost signal $flag_{boost}$ is the actual value of the frequency $f_{meas}$ in the electrical transmission network. In step 302, the actual value of the frequency is compared with a first predetermined frequency value for the triggering frequency $f_{trigger}$. If the actual value is smaller than the first predetermined frequency value, the output of the corresponding recognition circuit 304 is set to 1. The output signal of the recognition circuit 304 is applied to the SET input of a flip-flop 306 so that the boost signal $flag_{boost}$ is present at its Q output. If the actual value of the frequency during a comparison 308 is greater than a second predetermined frequency value for a reset frequency $f_{reset}$, this is recognized in the recognition circuit 310 and a corresponding 1 value is applied to the input of the OR circuit 312. At the other input of the OR circuit 312, the output of a time element 314 is applied, the output of which is applied to a comparator 316 for determining a predetermined period of time, the boost period $T_{boost}$. If the predetermined period of time $T_{boost}$ is exceeded, a 1 is applied to the OR circuit 312. Further conditions for the OR circuit 312 are described in the following. The output of the OR circuit 312 is applied to the RESET input of the flip-flop 306 which serves to set the Q output to zero.

The boost signal $flag_{boost}$ is applied to an IF-THEN branch 318. When the boost signal $flag_{boost}$ is applied, a frozen electrical power $P_{freeze}$ 320 is applied to the THEN-output. The frozen power $P_{freeze}$ 320 is fed back via a time element $z^{-1}$ 324. With the frozen power $P_{freeze}$ 320, the actual value of the electrical power is frozen before the boost signal occurs and is used as a basis for the control during boost operation.

In an additional block 301, an additional power $P_{inc}$ is determined as a power boost. Various approaches can be chosen for determining the power boost. One approach is based on the rated power $P_n$. In an alternative embodiment, the frozen power $P_{freeze}$ can be taken as the basis. Depending on the embodiment, a percentage value can then be multiplied by the base variable in order to get the power boost $P_{inc}$. Alternatively, it is also possible to choose a frequency-dependent factor that is then multiplied by the base variable depending on the frequency value. The frozen power $P_{freeze}$ and the additional power $P_{inc}$ are added together and are divided by the current actual value of the rotational speed $n_{meas}$ in order to determine the set point value for the generator torque $N*_{boost}$.

In summary, it can be noted regarding the procedure in FIG. 4 that, when the frequency is detected below the frequency value $f_{trigger}$, a boost signal $flag_{boost}$ is generated for a predefinable boost period $T_{boost}$. By using a second predetermined frequency $f_{reset}$, the boost mode can be exited early. Further possible conditions for an early exit of boost operation can be, for example, a minimum generator rotational speed. With the minimum generator rotational speed, a switch-off of the wind turbine as a result of boost operation can be avoided. Likewise, a minimum speed or a maximum rotational speed decrease can be defined for the generator in order to avoid stall operation and shutdown of the wind turbine. If boost operation is terminated early, the boost signal $flag_{boost}$ is also reset.

Figure 3:
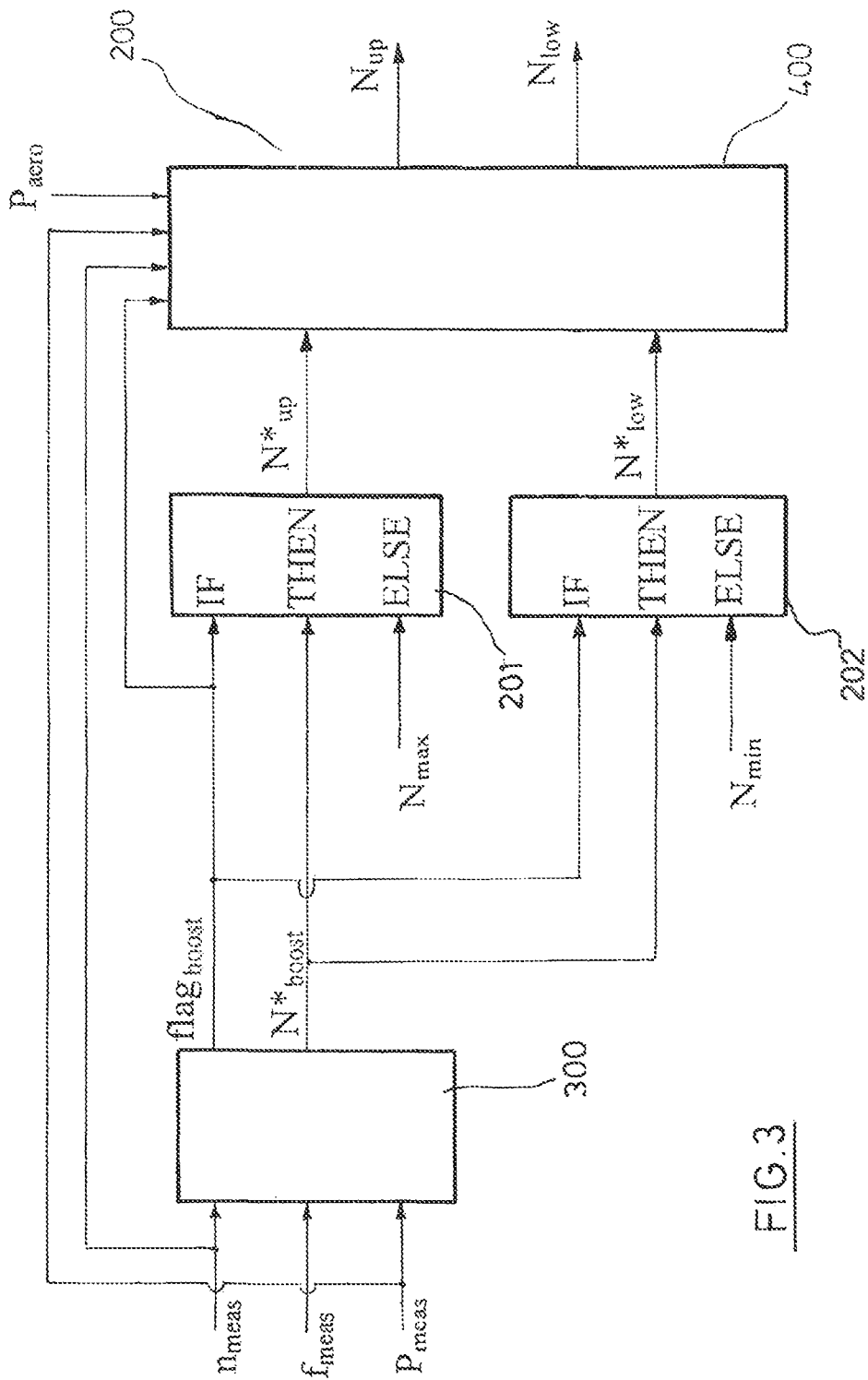
FIG. 3 illustrates a schematic diagram for determining the upper and lower limit for the limiter.

The calculation of the boost signal and the set point value for the generator torque in boost operation represented in FIG. 4 is performed according to the block diagram from FIG. 3 to determine the upper limit $N_{up}$ and the lower limit $N_{low}$ at the limiter 102. To determine the upper and lower limit for the limiter 102, the actual value of the rotational speed $n_{meas}$, the actual value of the frequency $f_{meas}$, and the actual value of the fed-in electrical power $P_{meas}$ are applied to a block 300 in FIG. 3. The block 300 possesses the design explained with reference to FIG. 4. The output variables from block 300 are the boost signal $flag_{boost}$ and the set point value for the torque $N*_{boost}$ in boost operation. The boost signal $flag_{boost}$ as well as the determined rotational speed set point value $N*_{boost}$ for boost operation are each applied to an IF-THEN branch 201 and 202. In addition, the values for the maximum torque $N_{max}$ and the minimum torque $N_{min}$ provided for normal operation are present as ELSE alternatives. As long as the boost signal $flag_{boost}$ is set, $N*_{boost}$ is output as the upper limit $N*_{up}$ 203 and the lower limit $N*_{low}$ 204 in the IF-THEN relationship. If there is no boost signal $flag_{boost}$, the value $N_{max}$ is set as the upper limit $N*_{up}$ and $N_{min}$ is set as the lower limit $N*_{low}$ for the limiter.

The upper and lower limits determined by the IF-THEN relationship are applied to a uniform control block 400. The uniform control block 400 also has the boost signal as well as the actual value of the rotational speed $n_{meas}$ and the actual value of the fed-in electrical power $P_{meas}$ as further input signals. This is in addition to the value of the power $P_{aero}$ currently available from the wind. In the uniform control block 400, the upper and lower limits $N_{low}$ and $N_{up}$ applied to the limiter are calculated from the applied set point values for the upper limit $N*_{up}$ and the lower $N*_{low}$. It is hereby a uniform control block 400, since it controls the applied set point values for the torque in each operating state that can occur in a virtual inertia function.

Figure 5:
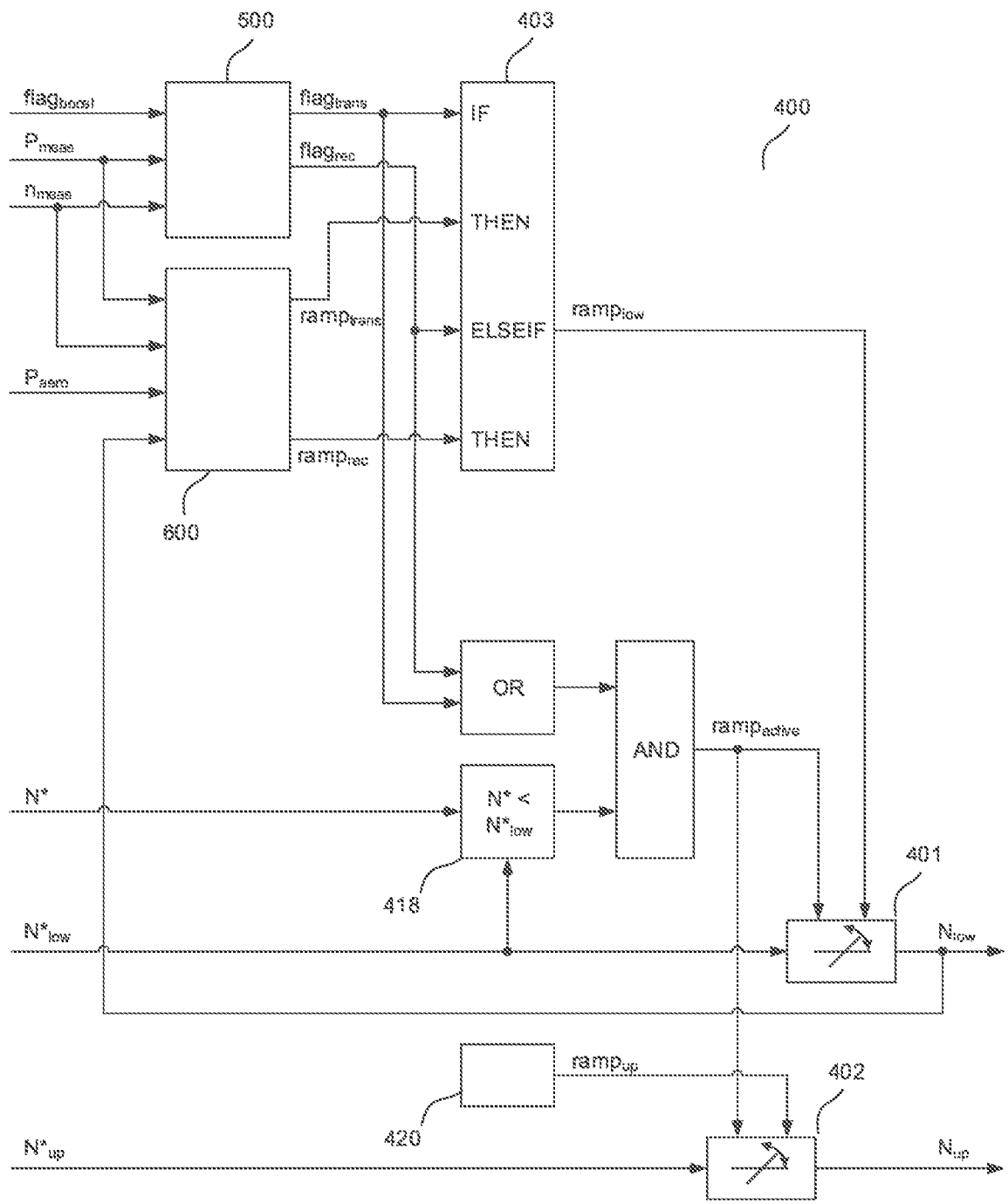
FIG. 5 illustrates a schematic diagram for determining the upper and lower limit during transition operation or recovery operation.

The conversion of the set point values $N*_{low}$ and $N*_{up}$ into control variables $N_{low}$ and $N_{up}$ takes place via a ramp function 401, 402. The ramp functions are activated via a ramp signal 410. The activation of the ramp function takes place when either the transition signal $flag_{trans}$ 412 or the recovery signal $flag_{recov}$ 414 is set. In addition, the set point value $N*$ 416 for the generator torque that is obtained from the torque control must be smaller at the comparator 418 than the set point value for the lower torque limit $N*_{low}$. Not represented in FIG. 5 is the further alternative of providing a second comparator that additionally checks whether the set point value for the generator torque $N*$ is potentially also greater than the set point value for the upper limit $N*_{up}$. In any case, it is a necessary requirement for the activation of the ramp functions 401 and 402 that the set point value N* for the generator torque is outside of the range defined by the set point values for the generator torque $N^*_{low}$ and $N^*_{up}$.

If the ramp functions are activated, the ramp $ramp_{low}$ is applied to the ramp function 401 for the lower limit at the limiter and the ramp $ramp_{up}$ is applied to the ramp function 402 for the upper limit at the limiter. The ramps are maximum permissible temporal changes for the generator torque.

The calculation of the ramp functions takes place in block 600. FIG. 7 shows four exemplary embodiments for the calculations of the ramps in block 600. During the calculation of the ramp functions, it must be differentiated whether a transition operation for the wind turbine is provided after the termination of boost operation or whether the control switches directly to recovery operation. FIGS. 7a and 7b relate to an operating mode in which the wind turbine switches directly to recovery mode, while FIGS. 7c and 7b characterize an interposed transition zone.

FIG. 7a shows the determination of a select signal 602 $ramp_{recov}$ for the ramp function. The select signal $ramp_{recov}$ is obtained, for example, from a look-up table in which the temporal change of the generator torque is provided as a function of the change of the rotational speed. The change of the rotational speed is determined from the actual value of the rotational speed $n_{meas}$ via a differentiating element 606. In the look-up table 604, the ratio of the power $P_{aero}$ that can be captured from the wind and the electrical power that is fed in is determined. In the look-up table, it must be considered that the rotational energy in the wind turbine increases as the rotational speed rises, while the electrical power that is fed in also decreases as the generator torque N decreases. The maximum permissible change of the generator torque is limited via the control signal $ramp_{recov}$ 602. When applied to the ramp functions, $ramp_{recov}$ can be applied both as $ramp_{low}$ to the ramp function 401 and as $ramp_{up}$ to the ramp function 402.

FIG. 7b shows an alternative embodiment in which the temporal derivative of the actual value is added to a constant change term $$\frac{dn^*}{dt}/_{const}.$$

The change in rotational speed that is excessively increased in this way is controlled via a control 610. The control 610 has a proportional element and can be designed as a P, PI, or PID control. The output variable of the control 610 is the control signal 602 $ramp_{recov}$ for the actuation of the ramp function 401 and 402.

FIG. 7c shows an example for calculating the control signals $ramp_{trans}$ and $ramp_{recov}$ for the ramp functions when there is a differentiation between transition operation and recovery operation after boost operation. During transition operation, a constant value $$\frac{dN^*}{dt}/_{const} 631$$

is set for the maximum permissible change of the generator torque. This specification is temporally constant for the transition zone. If a switch to recovery operation occurs after transition operation, a quotient variable 612 is subtracted, on the basis of the lower limit $N_{low}$ that was present before and that is set back by one time increment. The quotient variable 612 is composed of the quotient that is formed by the difference between the power $P_{aero}$ that is available from the wind and a preset power difference $\Delta P$. The denominator of the quotient is formed by the actual value of the rotational speed. The power divided by the rotational speed corresponds to a torque, wherein the quotient can be interpreted as a torque that should be set in order to keep a constant power difference $\Delta P$ below the available power $P_{aero}$. The present generator torque is reduced by this variable. The difference is divided by a time span $T_{sample}$ 614 in order to obtain in this manner a maximum permissible change in torque as the control signal $ramp_{recov}$ for the ramp function. The central idea in recovery operation is that the power difference $\Delta P$ is not captured from the wind in order to increase in this manner the rotational energy of the wind turbine.

Figure 7D:
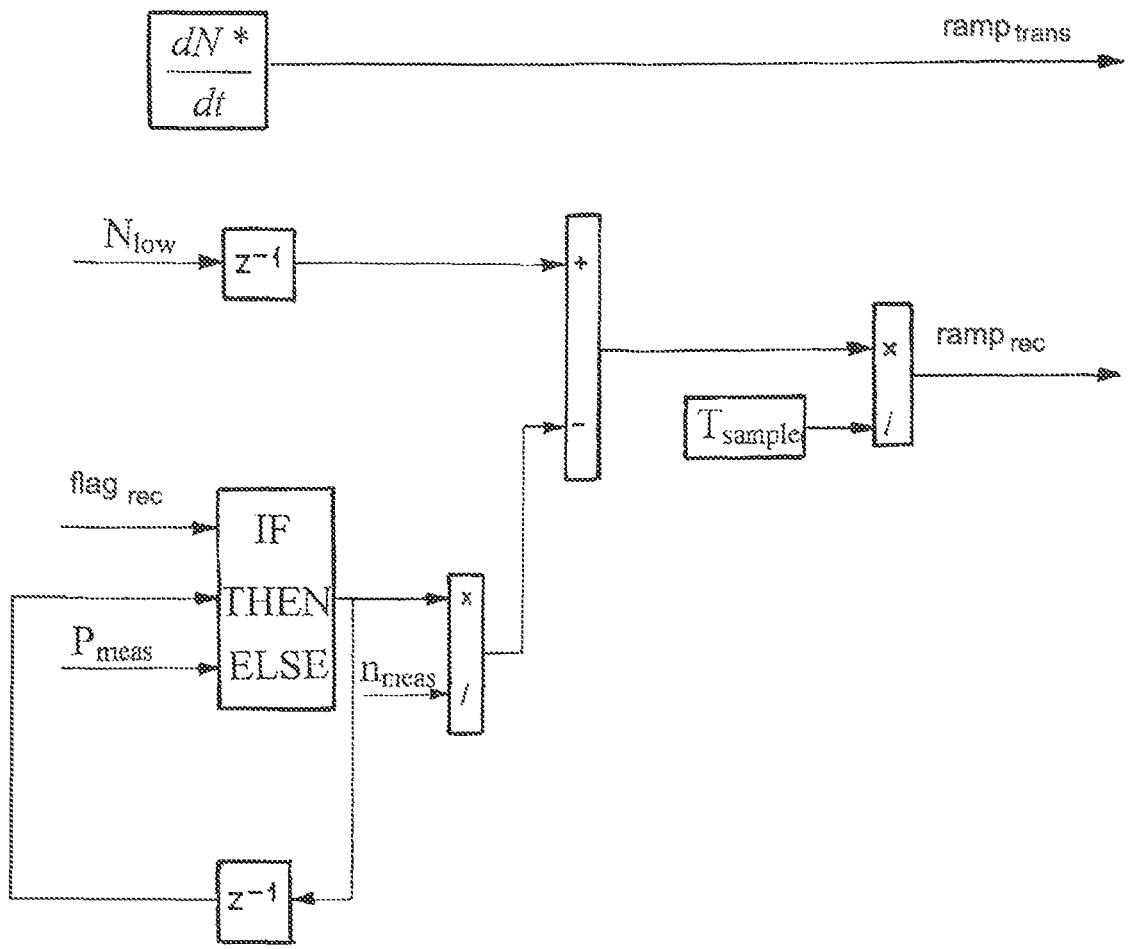
FIG. 7d illustrates a fourth embodiment of a method for operating the wind turbine in transition and/or recovery operation.

Another embodiment is explained in FIG. 7d. The control signal 602 for the ramp function is also set in this instance during transition operation to a constant value $$\frac{dN^*}{dt}/_{const} 641.$$

In recovery operation, the control signal $ramp_{recov}$ 616 is calculated with a similar approach as in FIG. 7c. However, the torque to be subtracted in step 618 is not determined based on a preset power difference, but is determined on the basis of the actual power value $P_{meas}$ and the actual value for the rotational speed. As long as the recovery signal $flag_{recov}$ is applied to the IF-THEN branch, the actual power value is held constant via the time element $z^{-1}$, i.e., held at the value before the switch to recovery operation occurred. The current actual value is chosen for the rotational speed $n_{meas}$. The central idea in this embodiment is that, by holding the power value, a proportional correction of the generator torque takes place corresponding to the actual value of the power when recovery operation begins, wherein the actual value of the rotational speed $n_{meas}$ is taken into account.

Figure 6:
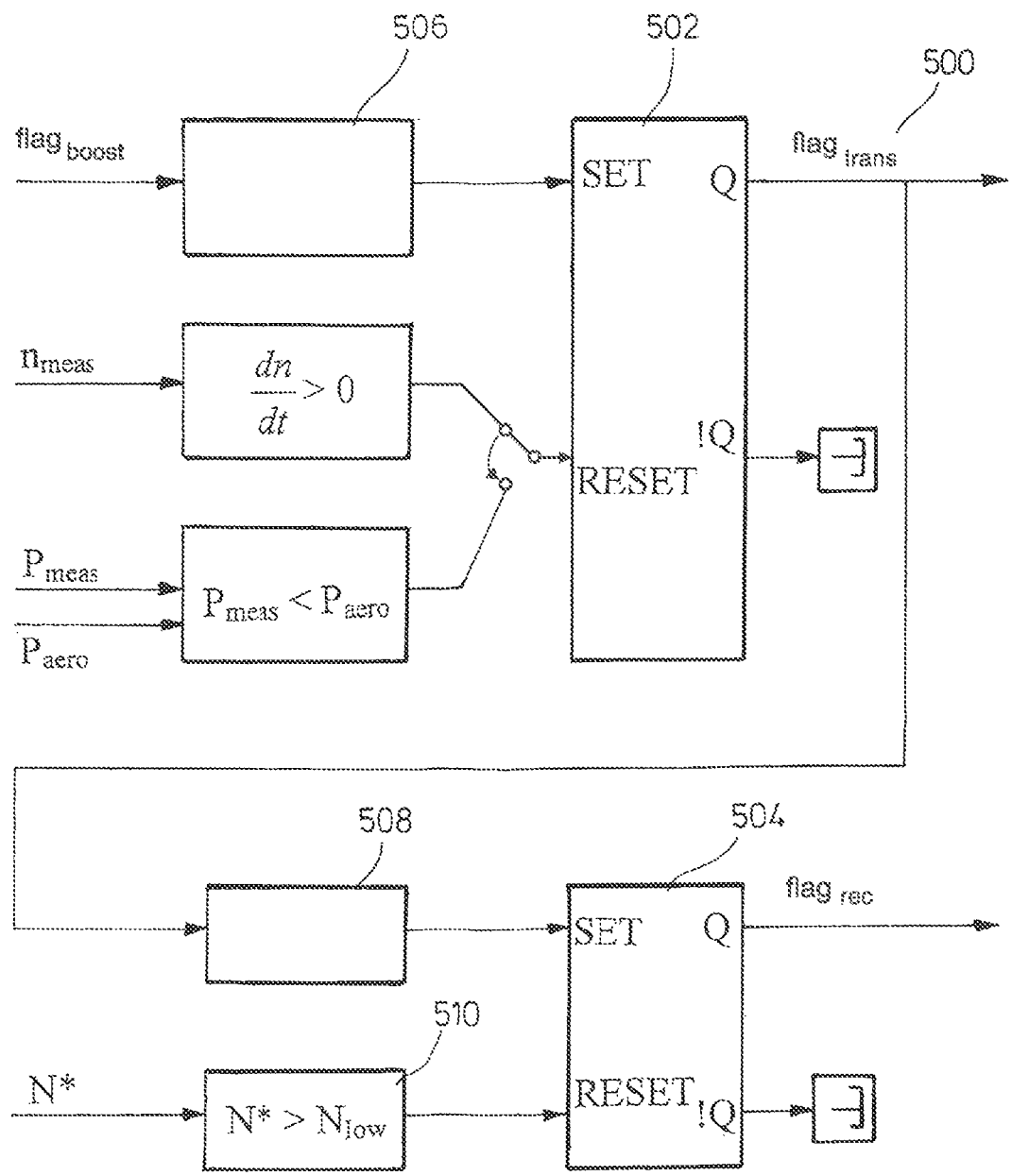
FIG. 6 illustrates a schematic diagram showing the process of switching from transition operation to recovery operation.

With reference to the uniform control block 600, this means that, when the transition signal $flag_{trans}$ 412 is applied in the IF-THEN branch 403, the control signal $ramp_{low}$ for the ramp function 401 corresponds to the calculated control signal $ramp_{trans}$. If, however, the recovery signal $flag_{recov}$ 414 is applied to the IF-THEN branch 403, the control signal $ramp_{low}$ for the ramp function 401 is set by the control signal 616 $ramp_{recov}$. Switching from the boost signal ($flag_{boost}$) to the transition signal ($flag_{trans}$) or the recovery signal ($flag_{recov}$) is represented in the switching block 500 in FIG. 5. A possible more detailed design for the switching block 500 can be found in FIG. 6.

Central elements for switching are two flip-flop circuits 502, 504. The boost signal $flag_{boost}$, which applies an input signal to the SET input of the flip-flop via a recognition circuit 506 in the case of a reduction of the boost signal and therefore generates a transition signal $flag_{trans}$ at the Q output of the flip-flop circuit 502, is applied to the SET input of the flip-flop circuit 502. The end condition for the transition zone is triggered by setting the RESET input of the flip-flop 502. It can either be taken into account for a termination of the transition zone that the change in rotational speed is positive. This means the rotational speed increases again so that the transition signal $flag_{trans}$ can be reset. As an alternative to an increase in rotational speed, a signal can also be applied to the RESET input of the flip-flop circuit when the measured power $P_{meas}$ is smaller than the power $P_{aero}$ currently available from the wind.

In both cases, the transition zone is terminated and the transition signal $flag_{trans}$ is reduced. In response to the reduction of the transition signal $flag_{trans}$, the detection unit 508 applies a signal to the SET input of the flip-flop circuit 504. Correspondingly, the recovery signal $flag_{recov}$ is set at the Q output. Recovery operation then continues until the output signal of the comparator 510 is applied to the RESET input of the flip-flop circuit 504, which indicates when the set point value for the generator torque N* is greater than the lower limit $N_{low}$ at the limiter. In addition, another comparator can be provided that compares whether the set point value N* is smaller than the upper limit value $N_{up}$ at the limiter.

The functionality of transition operation and recovery operation can be summarized as follows: A signal for transition operation is set once it is detected that boost operation has been deactivated and the signal for virtual inertia operation is set. Transition operation can be deactivated when one of the two conditions from FIG. 6 that are applied to the RESET input of the flip-flop circuit 502 is fulfilled. When the rotational speed is greater than a predefinable small positive value and is large enough to trigger speed oscillations in the generator. The second condition relates to the actual value of the electrical power that is fed in, for example in the form of effective power, compared to the estimated aerodynamic power $P_{aero}$ made available by the wind. A predefinable difference in the power is based on the losses between aerodynamic power and fed-in power and should be large enough to prevent a triggering of oscillations in the estimated aerodynamic power or in the effective power output.

If transition operation is terminated, recovery operation is initiated. Recovery operation is switched on as long as the torque set point value for normal operation is limited by the lower limit of the limiter (cf. comparator 510). A deactivation of recovery operation indicates that the wind turbine returns once again to its normal operation.

FIG. 8 shows the qualitative course of effective power P, generator torque N, rotational speed w, and frequency f in the electrical transmission network over time. Boost operation is triggered at the point in time $t_1$, in which the grid frequency f falls below a value $f_{trigger}$. At the point in time $t_1$, boost operation is triggered. After a short rise in the effective power that is fed in and the generator torque N, the power that is fed in reaches a constant value that is higher by $P_{inc}$ than the power value $P_{pre}$ that was previously used. In boost operation, the generator torque N rises and the rotational speed w decreases.

After the predetermined period of time for the increased feeding in of power $T_{boost}$, the point in time $t_2$ is reached and the transition zone takes place. The transition zone is characterized in that the generator torque N decreases with a constant gradient between the time span $t_2$ and $t_3$. In this time span, the rotational speed stabilizes. The transition zone is terminated when a lower power limit $P_{dip}$ is reached. In this manner, it is ensured that the power at the wind turbine does not fall too strongly and the wind turbine does not shut down. After the termination of transition operation, recovery operation begins at the point in time $t_3$. In recovery operation, both the torque and the rotational speed increase until recovery operation is terminated. At the conclusion of recovery operation, the electrical power that is fed in corresponds to the electrical power fed in before the drop in frequency.

REFERENCE SIGN LIST

10 Wind turbine
11 Tower
12 Nacelle
14 Rotor
16 Rotor blades
18 Asynchronous generator
20 Converter
24 Transformer
25 Electrical transmission network
26 Control
27 Wind farm control
28 PI element
102 Limiter
200 Limiter control
201 IF-THEN branch
202 IF-THEN branch
300 Block
301 Additional block
302 Comparator
304 Recognition circuit
306 Flip-flop
308 Comparator
310 Recognition circuit
312 OR circuit
314 Time element
316 Comparator
318 IF-THEN branch
320 Time element
322 Selection element
324 Selection element
326 Calculation element
400 Uniform control block
401 Ramp function
402 Ramp function
403 IF-THEN branch
418 Comparator
420 Memory block
500 Switching block
502 Flip-flop circuit
504 Flip-flop circuit
506 Recognition circuit
508 Recognition circuit
510 Comparator
600 Control block
604 Look-up table
606 Differentiating element
610 Control
n* Rotational speed set point value
$n_{meas}$ Rotational speed actual value
N* Torque set point value
N*' Limited torque set point value
$N^*_{boost}$ Set point value for the generator torque
$N_{low}$ Applied lower limit
$N_{up}$ Applied upper limit
$N^*_{low}$ Set point value for lower limit
$N^*_{up}$ Set point value for upper limit
$N_{min}$ Minimum torque
$N_{max}$ Maximum torque
$f_{meas}$ Measured grid frequency
$f_{trigger}$ Triggering frequency
$f_{reset}$ Reset frequency
$T_{boost}$ Boost period
$P_{aero}$ Available power
$P_{boost}(f)$ Power value determined depending on frequency
$P_{freeze}$ Frozen electrical power
$P_{inc}$ Power to be additionally provided
$P_{el}$ Electrical power fed in before the frequency dip occurs
$P_{meas}$ Measured electrical power
$P_n$ Rated power P_total Aggregated power set point value
N*_boost Set point value for generator torque in boost operation
N_max Maximum torque in normal operation
N_min Minimum torque in normal operation
flag_boost Boost signal
flag_trans Transition signal
flag_rec Recovery signal
ramp_low Ramp for the lower limit
ramp_up Ramp for the upper limit
ramp_rec Control signal for ramp function in recovery operation
ramp_trans Control signal for ramp function in transition operation
ramp_active Ramp signal $$\left.\frac{dn^*}{dt}\right|_{const}$$

Constant temporal change of the rotational speed $$\left.\frac{dN^*}{dt}\right|_{const}$$

Constant value for temporal change in torque
ΔP Constant power difference
P_dip Lower power limit

The invention claimed is:

1. A method for controlling a wind turbine that has a generator that is controlled via a converter in a boost operation, in which an electrical power that is fed into an electrical transmission network is increased by a generative deceleration of the generator, the method comprising:
   using a control to determine a set point value for a generator torque (N*) depending on an actual value of a rotational speed ($n_{meas}$);
   applying the determined set point value for the generator torque (N*) to a generator via a limiter with a predefinable upper and lower limit ($N_{up}$, $N_{low}$);
   determining the set point value for the generator torque (N*boost) in boost operation that leads to an increased fed-in electrical power ($P_{inc}$) in response to a boost signal ($flag_{boost}$); and
   limiting a temporal change of the set point value for the generator torque (dN*/dt) in a recovery operation in response to a recovery signal ($flag_{rec}$),
   wherein a maximum permissible temporal change of the set point value of the generator torque (dN*/dt) is determined depending on an actual value of the power ($P_{meas}$) that is fed in when the recovery signal occurs and on an actual value of the rotational speed ($n_{meas}$) with the recovery signal ($flag_{reco}$) set.

2. The method according to claim 1, wherein a maximum permissible temporal change of the set point value for the generator torque (dN*/dt) is determined depending on the temporal change of the rotational speed (dn/dt) when the recovery signal ($flag_{reco}$) set.

3. The method according to claim 1, wherein a maximum permissible temporal change of the set point value of the generator torque (dN*/dt) is determined using the actual value of the rotational speed ($n_{mess}$) and an available power ($P_{aero}$) with the recovery signal ($flag_{reco}$) set.

4. The method according to claim 1, wherein the recovery signal ($flag_{rec}$) is reset when the set point value of the generator torque (N*) is within a range specified by the upper limit ($N_{up}$) and the lower limit ($N_{low}$) of the limiter.

5. A method for controlling a wind turbine that has a generator that is controlled via a converter in a boost operation, in which an electrical power that is fed into an electrical transmission network is increased by a generative deceleration of the generator, the method comprising:
   using a control to determine a set point value for a generator torque (N*) depending on an actual value of a rotational speed ($n_{meas}$);
   applying the determined set point value for the generator torque (N*) to a generator via a limiter with a predefinable upper and lower limit ($N_{up}$, $N_{low}$);
   determining the set point value for the generator torque (N*boost) in boost operation that leads to an increased fed-in electrical power ($P_{inc}$) in response to a boost signal ($flag_{boost}$); and
   limiting a temporal change of the set point value for the generator torque (dN*/dt) in a recovery operation in response to a recovery signal ($flag_{rec}$), and further comprising a control with at least one of a P element and a PI element with the recovery signal ($flag_{reco}$) set that is configured to determine a maximum permissible temporal change of the set point value for the generator torque (dN*/dt) using the temporal change of the rotational speed ($dn_{meas}$/dt).

6. The method according to claim 5, further comprising adding a constant term (dn*/dt) to the temporal change of the actual value of the rotational speed ($dn_{meas}$/dt) to determination of the maximum permissible temporal change of the set point value for the generator torque (dN*/dt).

7. A method for controlling a wind turbine that has a generator that is controlled via a converter in a boost operation, in which an electrical power that is fed into an electrical transmission network is increased by a generative deceleration of the generator, the method comprising:
   using a control to determine a set point value for a generator torque (N*) depending on an actual value of a rotational speed ($n_{meas}$);
   applying the determined set point value for the generator torque (N*) to a generator via a limiter with a predefinable upper and lower limit ($N_{up}$, $N_{low}$);
   determining the set point value for the generator torque (N*boost) in boost operation that leads to an increased fed-in electrical power ($P_{inc}$) in response to a boost signal ($flag_{boost}$); and
   limiting a temporal change of the set point value for the generator torque (dN*/dt) in a recovery operation in response to a recovery signal ($flag_{rec}$),
   wherein the boost signal ($flag_{boost}$) is reset when one of a predetermined period of time ($T_{boost}$) has elapsed since the boost signal ($flag_{boost}$) has occurred and the actual value of the frequency ($f_{meas}$) in the electrical transmission network is greater than a second predetermined frequency value ($f_{reset}$), and wherein the second predetermined frequency value ($f_{reset}$) is greater than a first predetermined frequency value ($f_{trigger}$).

8. The method according to claim 7, wherein a transition signal ($flag_{trans}$) is generated when the boost signal ($flag_{boost}$) is reset and before a recovery signal ($flag_{rec}$).

9. The method according to claim 8, wherein a maximum permissible temporal change of the set point value for the generator torque (dN*/dt) is set to a constant value when the transition signal ($flag_{trans}$) is present.

10. The method according to claim 9, wherein the transition signal ($flag_{trans}$) is reset and the recovery signal ($flag_{rec}$) is set when the actual value of the rotational speed ($n_{meas}$) increases and a power ($P_{meas}$) that is fed in is smaller than an available power ($P_{aero}$).

11. The method according to claim 10, wherein the temporal change of the set point value for the generator torque (dN*/dt) is determined by a ramp function.

* * * * *

UNITED STATES PATENT AND TRADEMARK OFFICE
CERTIFICATE OF CORRECTION

| | | |
|---|---|---|
| PATENT NO. | : 10,711,765 B2 | Page 1 of 1 |
| APPLICATION NO. | : 16/104554 | |
| DATED | : July 14, 2020 | |
| INVENTOR(S) | : Simon De Rijcke, Niels Hamann and Christian Wessels | |

It is certified that error appears in the above-identified patent and that said Letters Patent is hereby corrected as shown below:

On the Title Page

Item (73), Assignee:
Please delete "Nordex Christian" and insert --Nordex Energy GmbH--.

Signed and Sealed this
Fourteenth Day of February, 2023

Katherine Kelly Vidal
*Director of the United States Patent and Trademark Office*